Jan. 31, 1950 J. H. SPEED 2,495,991
SAW FILER GUIDE
Filed Jan. 30, 1948
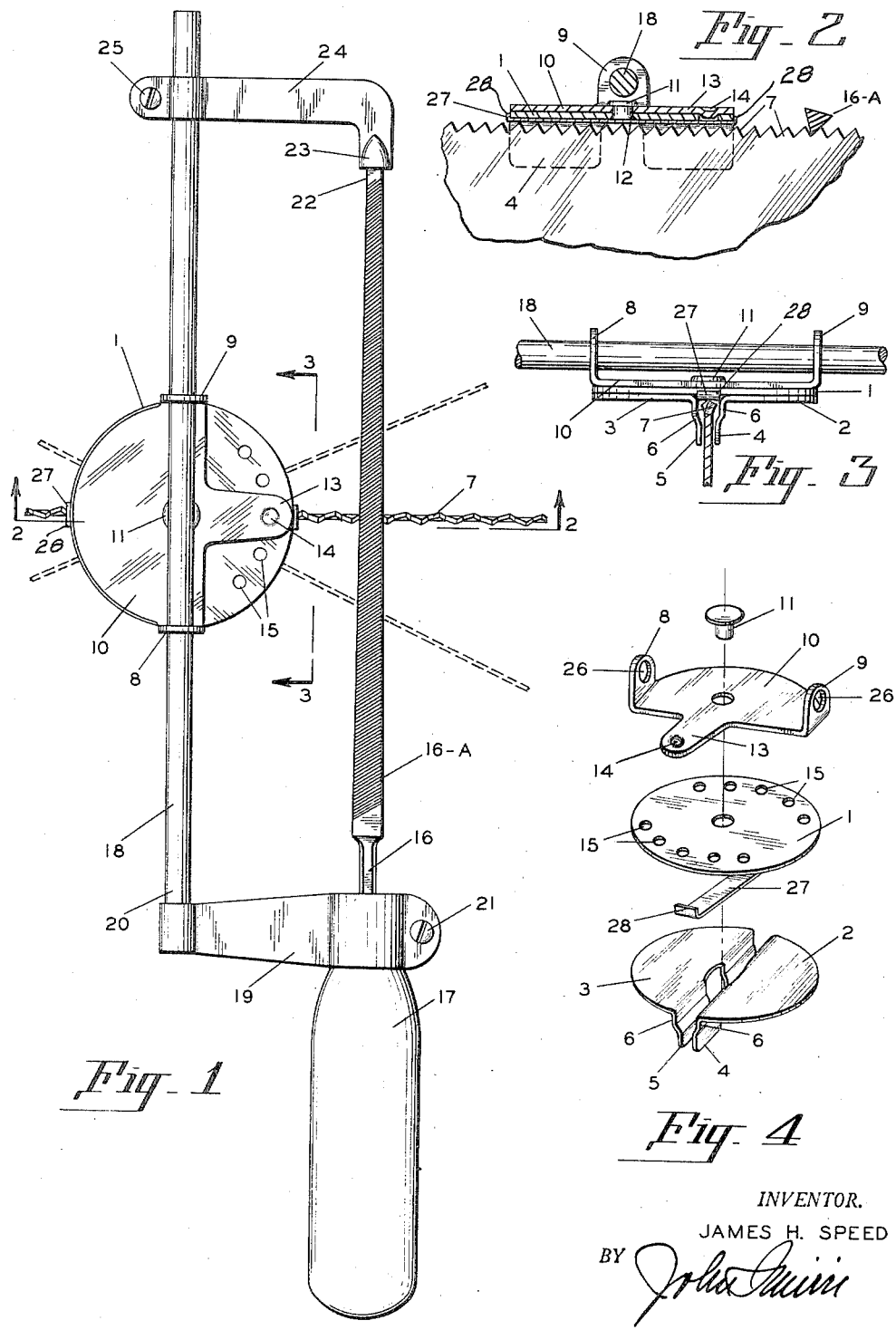
INVENTOR.
JAMES H. SPEED
BY
ATTORNEY Patented Jan. 31, 1950

2,495,991

UNITED STATES PATENT OFFICE 2,495,991

SAW FILER GUIDE

James H. Speed, Seaside, Oreg., assignor to Speed Corporation, Portland, Oreg.

Application January 30, 1948, Serial No. 5,250

1 Claim. (Cl. 76—36)

This invention relates to saw filer guides and it is an improvement over my present Patent No. 2,421,657, and it is particularly related to the filing of hand saws.

The primary object of the invention is to provide a guide for guiding the file between the teeth of the saw at a predetermined pitch and angle, and this improved model makes it possible to file both angles of the teeth without removing the guide from the saw.

A further object of the invention is the elimination of parts and clamps called for in the above mentioned patent. With my new and improved filer the sliding guide member for guiding the file is mounted directly over the center of the supporting guide assembly making it possible to direct the file at the desired angle from either side of the saw without removing the guide assembly from the saw.

With my new and improved file guide the supporting guide assembly rides freely on the saw and is not clamped to the saw by any spring tension, thereby permitting free movement of the same along the teeth. The free movement of the guide assembly permits the file to engage the cutting sides of adjoining teeth with equal filing contact.

A still further object of the invention is the providing of a replaceable wearing element for contacting the face of the teeth relative to the supporting guide assembly.

These and other incidental objects will be apparent in the drawings, specification and claim.

Referring to the drawings:

Figure 1 is a plan view of the filer mounted upon a saw at right angles. This angle is one of the filing positions, the other filing positions on the saw are indicated by dotted lines.

Figure 2 is an end sectional view of the filer taken on line 2—2 of Figure 1 mounted to the teeth of the saw.

Figure 3 is a detail side view of the guide assembly unit taken on line 3—3.

Figure 4 is an exploded view of the guide supporting assembly.

Referring more specifically to the drawings:

My new and improved saw file guide consists of a primary member 1 in the form of a disk having guide members 2 and 3 securely fastened underneath the same as by spot welding in the event that the device is made up from stampings, but in the event the device is made from die casting the members 1, 2 and 3 may all be formed in one piece.

The guide members 2 and 3 have downwardly extending legs 4 and 5 which are spaced apart providing guides for embracing the saw. The portions 6 being spaced somewhat further apart than their lower edges of the guides 4 and 5. The object of which is to provide a clearance for the set of the teeth 7 of the saw best illustrated in Figure 3. Guides 8 and 9 extend upwardly and form part of the turn-table member or plate 10. This member 10 is pivotally mounted to the primary member 1 by a suitable means as the rivet 11, which is countersunk at 12 within the member 1, best illustrated in Figure 2.

A spring arm 13 forms part of the plate 10 and has the detent 14 punched therein and registering with the indents 15 within the main body member 1. This holds the guides 8 and 9 at a desired angle relative to the guides or legs 4 and 5 or at the desired angle to the saw being filed.

The end 16 of the file 16A is held within the handle 17 which is clamped to the guide rod 18 by way of the bracket 19 which is fixedly mounted to the end 20 of the rod 18 and clamped to the handle 17 by the clamping screw 21. By loosening the screw 21 the handle and file may be revolved increasing or decreasing the hook on the teeth of the saw. The opposite end 22 of the file is held by the socket 23 formed in the bracket 24 which is adjustably clamped by the screw 25 to the guide rod 18. The rod 18 slides freely through the holes 26 of the guides 8 and 9.

A wearing strip of hardened metal is indicated at 27 and is held between the legs or guides 4 and 5 best illustrated in Figures 2 and 3. The up turned ends 28 clamping the same to the main body 1 holding the same in the position as indicated.

In the operation of my new filer the guide turn-table 10 is revolved to the desired angle relative to the main member 1. The detent 14 of the arm 13 entering the indents 15 located on the main member 1 holding the guide turn-table 10 at the desired angle to the saw and will maintain the same at this angle.

It will be noted that the legs or guide members 4 and 5 run freely along the saw 7 best illustrated in Figure 3, maintaining the guide assembly at a fixed relation to the saw still offering very little resistance to the movement of the file between adjacent teeth insuring evenly filed cutting faces simultaneously on the saw teeth.

What I claim as new is:

A new sharpening device comprising a disk formed with a series of indentations near the edge thereof, a yoke pivoted to the disk to receive a file carrying member, said yoke having a tongue with a projection to cooperate with the indentations in the disk to set the angle of a saw to be sharpened, two oppositely spaced apart plates secured to the bottom of the disk, having resilient flanges bent toward each other and spaced apart for the reception of a saw and engage the sides of a saw to hold the latter in position while being sharpened, and a hardened steel plate located in the space between the oppositely disposed plates under the disk, the ends of the hardened steel plate being turned up to embrace the opposite edges of the disk, whereby a saw while being sharpened is gripped under the disk and teeth are protected by the steel plate.

JAMES H. SPEED.

REFERENCES CITED

The following references are of record in the file of this patent:

UNITED STATES PATENTS

| Number | Name | Date |
|---|---|---|
| 1,290,667 | Sanford | Jan. 7, 1919 |
| 2,359,668 | Ogle | Oct. 3, 1944 |
| 2,421,657 | Speed | June 3, 1947 |